United States Patent
Bikumala et al.

(10) Patent No.: US 11,288,363 B2
(45) Date of Patent: Mar. 29, 2022

(54) SYSTEM AND METHOD OF MICROPHONE INTRUSION DETECTION AND NOTIFICATION

(71) Applicant: DELL PRODUCTS, LP, Round Rock, TX (US)

(72) Inventors: Sathish Bikumala, Round Rock, TX (US); Jace W. Files, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 538 days.

(21) Appl. No.: 16/261,992

(22) Filed: Jan. 30, 2019

(65) Prior Publication Data

US 2020/0242241 A1    Jul. 30, 2020

(51) Int. Cl.
*G06F 21/55* (2013.01)
*H04R 29/00* (2006.01)
*H04R 3/00* (2006.01)

(52) U.S. Cl.
CPC .......... *G06F 21/554* (2013.01); *G06F 21/552* (2013.01); *H04R 3/00* (2013.01); *H04R 29/008* (2013.01); *G06F 2221/034* (2013.01)

(58) Field of Classification Search
CPC ........ H04R 29/008; H04R 29/00; H04R 3/00; G06F 21/567; G06F 21/55; G06F 21/554; G06F 21/566; G06F 2221/034; G06F 21/552
USPC ............................ 381/111, 56, 107; 361/5, 6
See application file for complete search history.

(56) References Cited

U.S. PATENT DOCUMENTS

| | | | | |
|---|---|---|---|---|
| 4,099,025 A | * | 7/1978 | Kahn | H04R 3/005 381/107 |
| 4,344,071 A | * | 8/1982 | Allen | H03K 17/945 340/566 |
| 5,457,591 A | | 10/1995 | Mock et al. | |
| 5,708,722 A | * | 1/1998 | Forgues | H03G 7/005 381/104 |
| 6,209,011 B1 | | 3/2001 | Vong et al. | |
| 9,369,560 B2 | * | 6/2016 | Kim | H04M 1/72463 |
| 2009/0033756 A1 | | 2/2009 | Kamatani et al. | |
| 2009/0052677 A1 | * | 2/2009 | Smith | H04S 7/40 381/56 |
| 2015/0304786 A1 | * | 10/2015 | Partio | H04R 29/004 381/58 |
| 2016/0105598 A1 | | 4/2016 | Zeira et al. | |
| 2019/0214019 A1 | * | 7/2019 | White | H04R 1/326 |
| 2019/0246014 A1 | | 8/2019 | Huang et al. | |
| 2021/0208478 A1 | * | 7/2021 | Kanas | G06F 1/1605 |

\* cited by examiner

*Primary Examiner* — Paul Kim
(74) *Attorney, Agent, or Firm* — Larson Newman, LLP

(57) ABSTRACT

An activity sensing circuit includes an ammeter circuit configured to monitor a supply current drawn specifically by a webcam. A hardware trigger circuit receives a webcam supply current monitoring signal from the ammeter circuit, and detects when the webcam supply current monitoring signal indicates the supply current drawn specifically by the webcam exceeds a first threshold supply current level. In response to detection of the supply current exceeding the first threshold supply current level, the trigger circuit notifies an indicator circuit to provide a user-perceptible indication. The indicator circuit is immune to control by a processor of an information handling system of which it is part.

20 Claims, 6 Drawing Sheets

SYSTEM AND METHOD OF MICROPHONE INTRUSION DETECTION AND NOTIFICATION

CROSS-REFERENCE TO RELATED APPLICATION

Related subject matter is contained in co-pending U.S. patent application Ser. No. 16/261,984 entitled "System and Method of Webcam Intrusion Detection and Notification," filed Jan. 30, 2019, the disclosure of which is hereby incorporated by reference.

FIELD OF THE DISCLOSURE

The present disclosure generally relates to information handling systems, and more particularly relates to webcam intrusion detection and notification.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An activity sensing circuit includes an ammeter circuit configured to monitor a supply current drawn specifically by a webcam. A hardware trigger circuit receives a webcam supply current monitoring signal from the ammeter circuit, and detects when the webcam supply current monitoring signal indicates the supply current drawn specifically by the webcam exceeds a first threshold supply current level. In response to detection of the supply current exceeding the first threshold supply current level, the trigger circuit notifies an indicator circuit to provide a user-perceptible indication. The indicator circuit is immune to control by a processor of an information handling system of which it is part.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
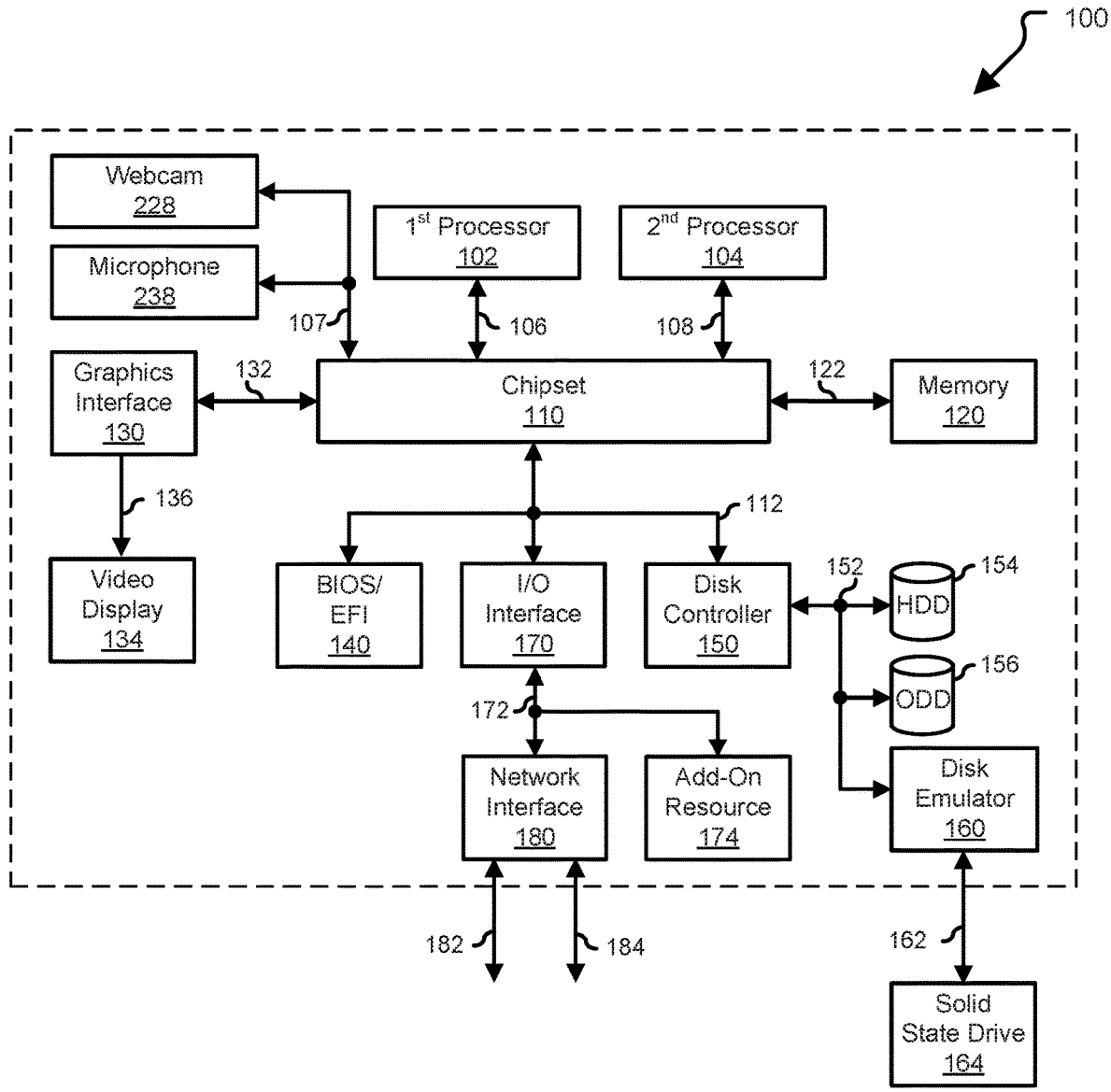
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof. The information handling system 100 also includes a webcam 228 and a microphone 238 that may be vulnerable to exploitation in conventional systems. The term "webcam," as used herein, refers to a camera built into an information handling system.

Figure 2:
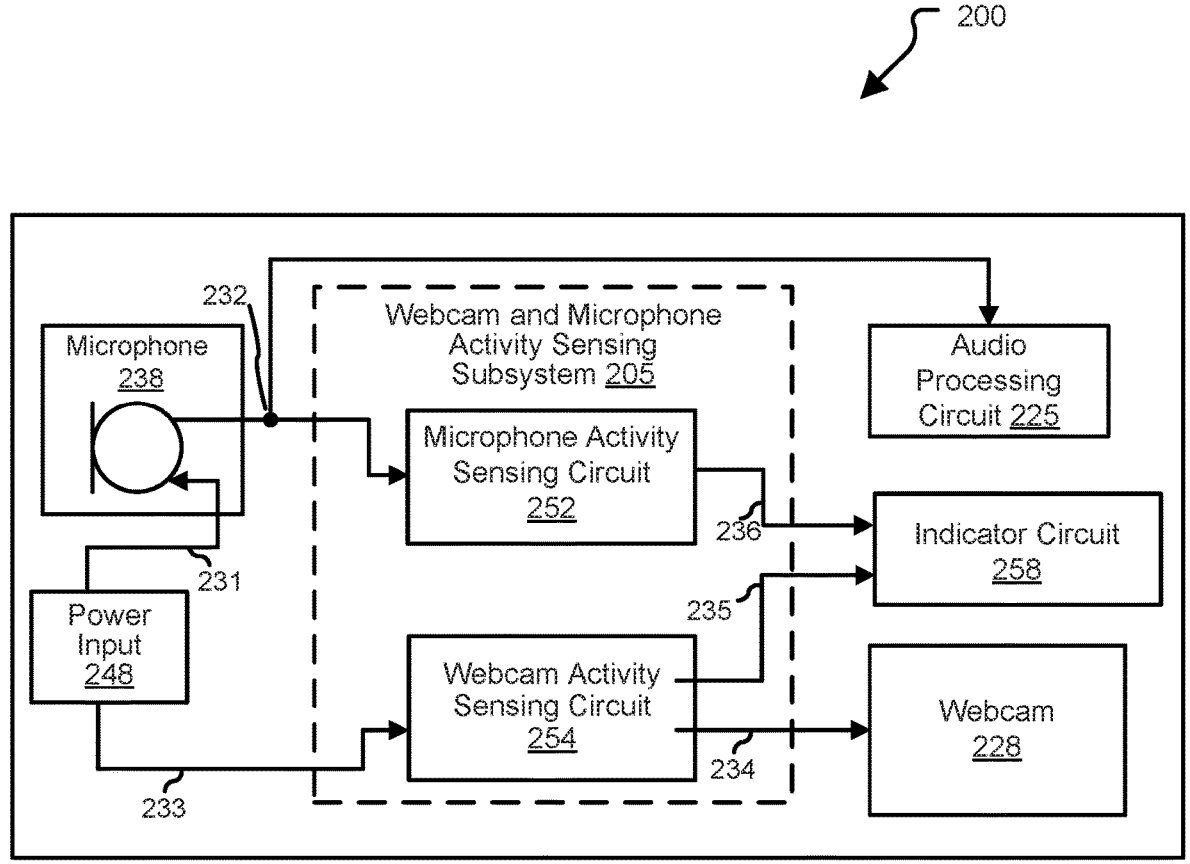
FIG. 2 is a block diagram of an information handling system including a webcam and microphone activity sensing subsystem according to an embodiment of the present disclosure.

FIG. 2 shows an information handling system 200 to mitigate this problem that has a webcam and microphone activity sensing subsystem 205, audio processing circuit 225, a power input 248, and an indicator circuit 258. Webcam and microphone activity sensing subsystem 205 includes a microphone activity sensing circuit 252 and a webcam activity sensing circuit 254. Examples of audio processing circuit 225 include a sound card, an audio codec, an analog-to-digital converter (ADC), and a processor configured to decimate a digitally modulated microphone signal (such as a pulse density modulated (PDM) microphone signal). Power input 248 is connected to webcam activity sensing circuit 254 at node 233. Webcam activity sensing circuit 254 is connected to webcam 228 at node 234 and connected to indicator circuit 258 at node 235. Power input 248 is connected to microphone 238 at node 231. Microphone 238 is connected to audio processing circuit 225 and webcam and microphone activity sensing subsystem 205 at node 232. Microphone activity sensing circuit 252 is connected to indicator circuit 258 at node 236.

Webcam 228 draws power as a supply current $I_{DD}$ from power input 248 via node 234. Power input 248 may be a DC and an AC voltage supply. Power input 248 outputs the drawn power as the supply current $I_{DD}$ to webcam activity sensing circuit 254 at node 233. Power input 248 may alternatively output the drawn power as a voltage $V_{DD}$ to webcam activity sensing circuit 254. Webcam activity sensing circuit 254 senses and monitors the supply current $I_{DD}$ that is drawn from power input 248 by webcam 228. Webcam activity sensing circuit 254 may send a signal via node 235 to turn on and activate indicator circuit 258 based on an amount of the supply current $I_{DD}$.

Power input 238 may output power as a supply voltage to microphone 238 at node 231. Microphone 238 may convert sound incident upon it to an electrical signal, which it may provide to audio processing circuit 225 and microphone activity sensing circuit 252 at node 232. Audio processing circuit 225 may convert a digital data signal to audible analog sound waves that are output at a speaker, not shown here. Microphone activity sensing circuit 252 may send a signal via node 236 to turn on and activate indicator circuit 258 based on the electrical signal from microphone 238 at node 232. Webcam activity sensing circuit 254 and microphone activity sensing circuit 252 are shown as being separate and distinct circuits but alternatively may be combined into a single circuit by using additional electronic components, such as a logic gate and the like.

Figure 3:
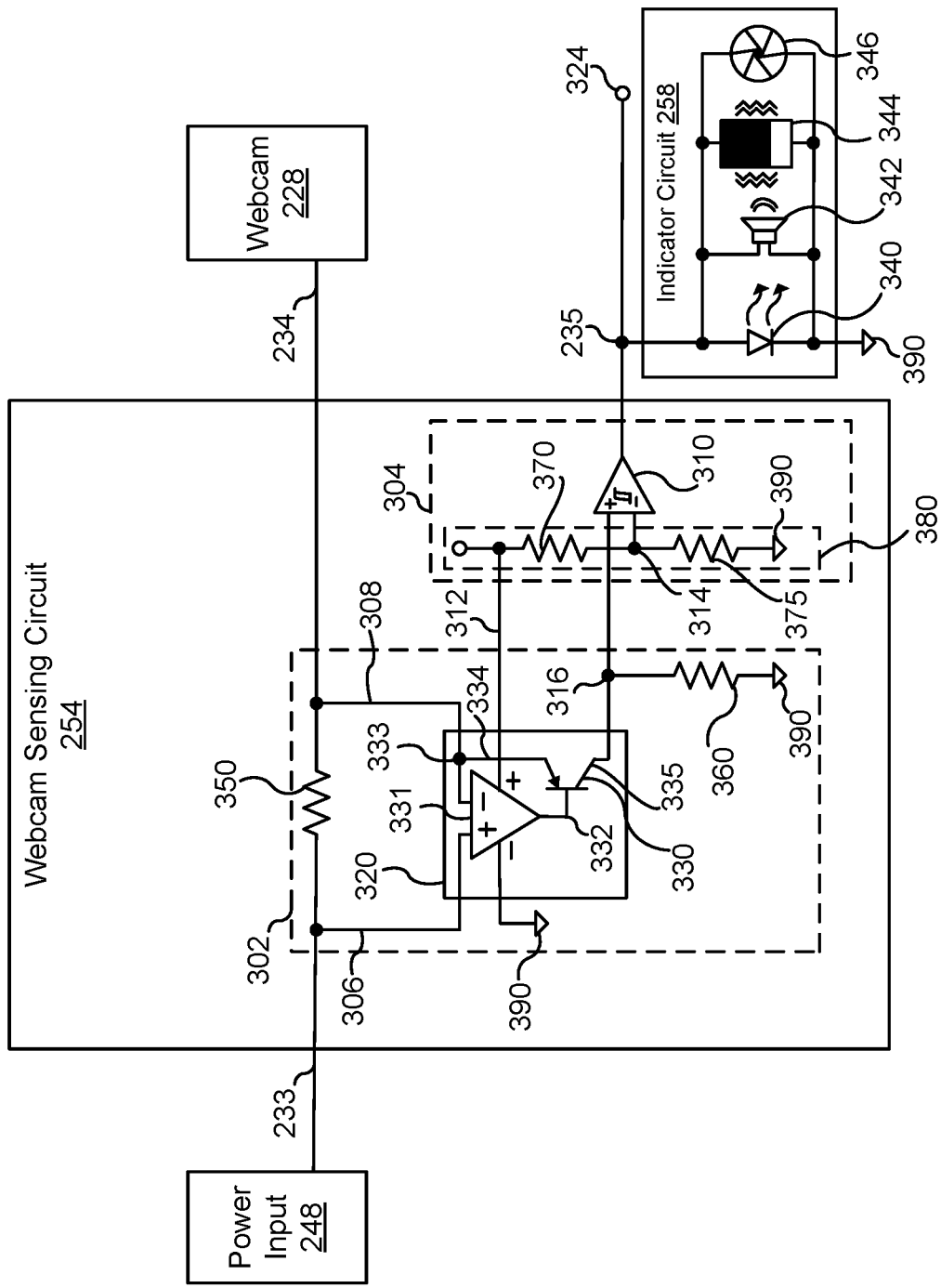
FIG. 3 is a block diagram illustrating an exemplary webcam activity sensing circuit of the webcam and microphone activity sensing subsystem according to an embodiment of the present disclosure.

FIG. 3 shows the webcam activity sensing circuit 254 in greater detail. The circuit 254 may include an ammeter circuit 302 and a hardware trigger circuit 304. Ammeter circuit 302 may include a resistor 350, a current sense amplifier 320, and a resistor 360. Resistor 350 may be an external sense resistor, a current shunt resistor, or the like. Current sense amplifier 320 includes an amplifier 331 and an output transistor 330. Current sense amplifier 320 may be a high side current sense amplifier, a versatile high side current sense amplifier, or the like. Current sense amplifier 320 monitors the supply current $I_{DD}$ drained from power input 248 by webcam 228 via the voltage drop across an ammeter current shunt including resistor 350. Current sense amplifier 320 may be an LT6106 that is available from Linear Technology. The LT6106 is a versatile high side current sense amplifier that includes an amplification stage that is followed by an output transistor. Resistor 360 may be a pulldown resistor that pulls an output of output transistor 330 to an equipotential 390. Equipotential 390 may be a ground or zero volts. Alternatively, ammeter circuit 302 may include an inductively coupled ammeter circuit, an isolated ammeter circuit, or the like.

Hardware trigger circuit 304 includes a voltage reference, such as voltage divider 380, and a Schmitt-trigger circuit 310, such as a Schmitt-trigger comparator circuit. An input of the Schmitt-trigger comparator circuit is connected to a reference voltage output of the voltage reference. Voltage divider 380 includes a resistor 370 and a resistor 375. Alternatively, the voltage reference may be formed from one or more semiconductor junctions, such as a bandgap reference or a voltage reference based on one or more diode or transistor junctions. Hardware trigger circuit 304 alternatively may include a magnetic tunnel junction, an inverting comparator circuit with a positive feedback, or the like.

Indicator circuit 258 provides a user-perceptible indication to a user. Indicator circuit 258 includes a light emitting diode (LED) 340, a speaker 342, a haptic device 344, and a mechanical shutter 346. LED 340 may emit light as a notification that webcam 228 is turned on and being used, even if covertly so. LED 340 may include an organic light emitting diode (OLED) notification, or the like. Speaker 342 may include an audio toner, a buzzer, a bell, or the like as the notification. Speaker 342 may provide any form of an audible indication as the notification. Haptic device 344 may provide a shake, a vibration, a pulse, or the like as the notification. Haptic device 344 may provide any form of touch sense feedback as the notification. Mechanical shutter 346 may open a slider mechanism based on the webcam having an active state and may close the slider mechanism based on the webcam having an idle state. Mechanical shutter 346 may expose a microphone aperture, such as a hole leading to a microphone diaphragm, based on the microphone having an active state and may close or obscure the microphone aperture based on the microphone having an idle state. Indicator circuit 258 is shown as being external to webcam activity sensing circuit 254 but may alternatively be internal to the webcam activity sensing circuit. Indicator circuit 248 is in information handling system 100 but is immune to control by any and all of processors, such as processor 102 and processor 104, within information handling system 100.

In accordance with at least one embodiment, a small piezoelectric speaker can be placed near the microphone to saturate a dynamic range of the microphone at an ultrasonic frequency. An ultrasonic frequency cannot be heard by human ears but will completely disable the microphone by saturating the input signal. In accordance with at least one embodiment, a light source, such as a light emitting diode (LED) or a laser diode, can be placed near the webcam to saturate the dynamic range of the image sensor of the camera. As an example, the light source can be a visible light source or a light source operating outside of visible wavelengths, such as an infrared (IR) light source. The light source can be arranged to provide its light, either proximal or distal to the location of the image sensor of the webcam with respect to an IR blocking filter interposed in the optical path of the camera. For example, by providing the light between the IR blocking filter and a focal plane image sensor of the webcam, the attenuating effect of the IR blocking filter on IR light can be avoided, allowing an IR light source to more readily achieve saturation of the dynamic range of the image sensor of the webcam. As another example, since the attenuation of an IR blocking filter is often fairly mild, either a visible or IR light source can be employed beyond the IR blocking filter, as a sufficient amount of light can be made to pass through the IR blocking filter to saturate the dynamic range of the image sensor of the webcam.

Power input 248 is connected to webcam activity sensing circuit 254 at node 233. Webcam activity sensing circuit 254 is embedded in series with and connected to webcam 228 at node 234. Webcam activity sensing circuit 254 is connected to indicator circuit 258 at node 235. Power input 248 is connected to webcam activity sensing circuit 254 via ammeter circuit 302. Power input 248 is specifically connected to a first terminal end of resistor 350 of ammeter circuit 302 at node 233. Power input 248 is also connected to a first connector 306 of current sense amplifier 320 of ammeter circuit 302 at node 233. The first terminal end of resistor 350 is connected to first connector 306 of current sense amplifier 320 at node 233. A second terminal end of resistor 350 is connected to a second connector 308 of current sense amplifier 320 at node 234. The second terminal end of resistor 350 is connected to webcam 228 at node 234. Current sense amplifier receives a reference voltage $V_{DD}$ via a non-inverting supply voltage input terminal at node 312. At an inverting voltage output terminal, current sense amplifier 320 is connected to equipotential 390. Equipotential 390 may be the ground or zero volts. Current sense amplifier 320 senses a voltage drop across resistor 350 as the supply current $I_{DD}$ is drawn from power input by webcam 234 when activated. Current sense amplifier 320 measures an amount of the supply current $I_{DD}$ based on the voltage drop.

First connector 306 is connected to a non-inverting input of amplifier 331, and second connector 308 is connected to an inverting input of amplifier 331. An output of amplifier 331 is connected to a gate of output transistor 330 at node 332. Second connector 308 is connected to an emitter 334 of output transistor 330 at node 333. A collector 335 of output transistor 330 is connected to non-inverting input terminal of Schmitt-trigger 310 at node 316. Output transistor 330 may operate as a bipolar junction transistor such as a PNP transistor, or the like. A small amount of current leaving a base of output transistor 330 is amplified as the collector output when output transistor 330 is ON or activated. When ON, the base is pulled low relative to the emitter of output transistor 330 and the voltage is output to the non-inverting input terminal of Schmitt-trigger 310 at node 316. When OFF, the base of output transistor 330 is not pulled low relative to the emitter, and resistor 360 acts to pull the voltage that is output from the collector 335 down to equipotential 390 at node 316.

Hardware trigger 304 may receive a reference voltage at node 312. The reference voltage may be equal to the voltage $V_{DD}$ that is drawn from power input 248 by webcam 228. The voltage $V_{DD}$ is supplied at a first terminal end of resistor 370 of voltage divider 380. A second terminal end of resistor 370 is connected to an inverting voltage input of Schmitt-trigger 310 at node 314. The second terminal end of resistor 370 is also connected to a first terminal end of resistor 375 of voltage divider 380. The second terminal end of resistor 375 is connected to equipotential 390. Voltage divider 380 provides a reference voltage such as a threshold current I_thresh to Schmitt-trigger 310.

A threshold used as a reference voltage to detect webcam use may be a threshold voltage or power threshold. The threshold may be predetermined based on the webcam product type, a webcam current/power consumption specified by a manufacturer, or the like. The threshold may be based on an operating or standby power consumption of the webcam. The threshold may also be based on a sleep current or supply current of the webcam. The threshold use may have a customized hardware-based trigger point that can notify the user when the webcam is in use. The threshold may be automatically and dynamically determined based on the product specifications and type of the webcam.

Schmitt-trigger 310 outputs a voltage as a $V_{CAM\_DETECT}$ signal 324 to indicator circuit 258 at node 235. Schmitt-trigger 310 may be a logic integrated circuit with a built-in Schmitt-trigger. Schmitt-trigger 310 may alternatively be a transistor based Schmitt-trigger or an operational amplifier based Schmitt-trigger. $V_{CAM\_DETECT}$ signal 324 enables indicator circuit 258 to turn on LED device 340. LED device 340 emits a light as an output that indicates that webcam 228 is active and in use. Indicator circuit 258 may also enable an audio toner to emit one or more sounds or to provide one or more haptic feedback notifications of webcam use. Indicator circuit 258 may activate any combination of visual, audio, and haptic feedback notifications. The notification can be hardware-based, software based, or both. The hardware-based notification cannot be disabled via malicious software. Because the current-sense system and techniques are based on hardware, they are extensible to an inbuilt microphone of the information handling system 200.

Webcam and microphone activity sensing subsystem 205 thereby detects and monitors the supply current $I_{DD}$ drawn by webcam 228 from power input 248. If a value of a magnitude of the supply current $I_{DD}$ rises above a current threshold, webcam and microphone activity sensing subsystem 205 sends a signal to indicator circuit 258 to cause an indication that webcam 228 is active and in use. In instances where the supply current $I_{DD}$ drawn by or supplied to a component of information handling system 200 may be difficult to detect and monitor due to a low-current draw, a more sensitive circuit may be required, which can add additional costs. Webcam and microphone activity sensing subsystem 205 detects and monitors a signal output from microphone 228 via a microphone activity sensing circuit.

Figure 4:
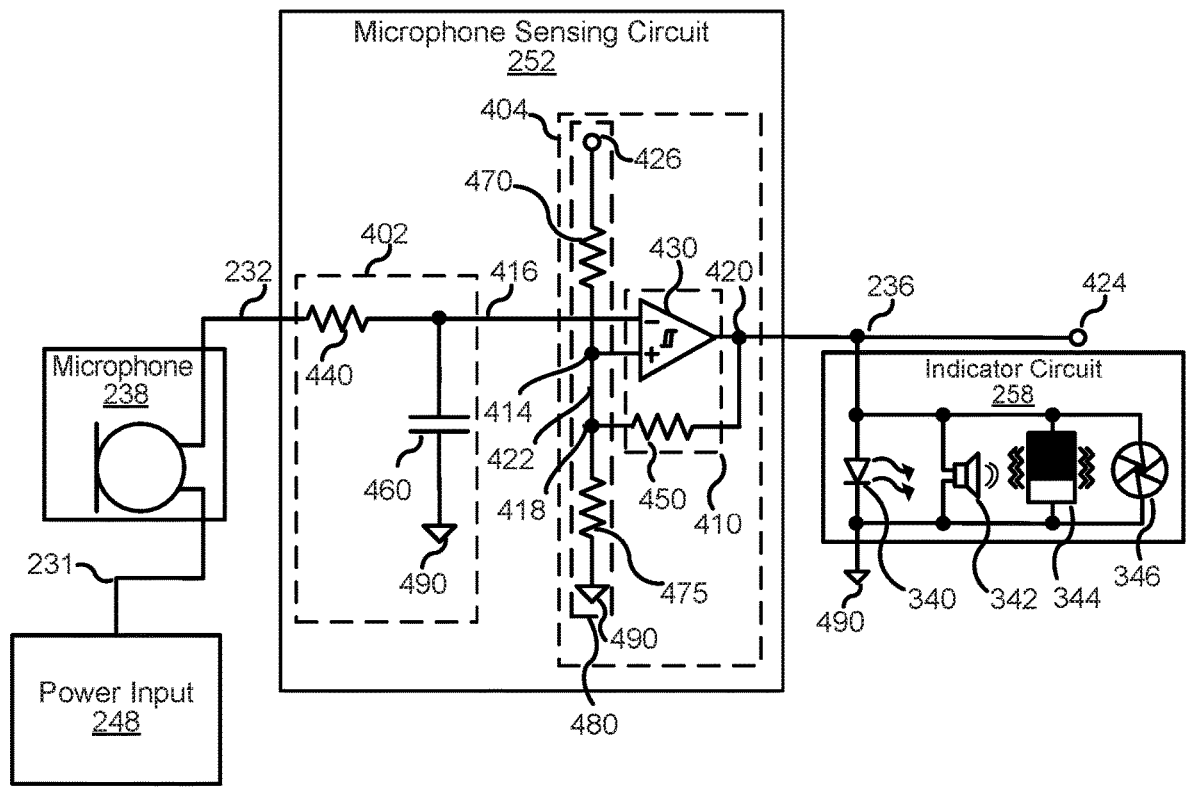
FIG. 4 is a block diagram illustrating an exemplary microphone activity sensing circuit of the webcam and microphone activity sensing subsystem according to an embodiment of the present disclosure.

FIG. 4 shows the microphone activity sensing circuit 252 in greater detail. Power input 248 is connected to microphone 238 at node 231. Microphone 238 is connected to microphone activity sensing circuit 252 at node 232. Microphone activity sensing circuit 252 is connected to indicator circuit 258 at node 236.

Microphone activity sensing circuit 252 includes a low pass filter 402 and a hardware trigger circuit 404. Low pass filter 402 is connected to hardware trigger circuit 404 at node 416. Low pass filter includes a resistor 440 and a capacitor 460. Resistor 440 is connected to capacitor 460 at node 416. A terminal end of capacitor 460 is connected to equipotential 490. Equipotential 490 may be a ground or zero volts. Hardware trigger circuit 404 includes a voltage divider 480 and a Schmitt-trigger circuit 410. Voltage divider 480 is connected to Schmitt-trigger circuit 410 at node 414 and node 418. Voltage divider 480 includes a resistor 470 and a resistor 475. A first terminal end of resistor 470 is connected to a reference voltage 426. A second terminal end of resistor 470 ends at node 414. A first terminal end of resistor 475 ends at node 418. Node 414 is connected to node 418 via node 422. The second terminal end of resistor 470 is thereby coupled with the first terminal end of resistor 475 at node 422. The second terminal end of resistor 475 is connected to equipotential 490.

Schmitt-trigger circuit 410 includes an operational amplifier 430 and a resistor 450. An inverting input of operational amplifier 430 is connected to an output voltage of low pass filter 402 at node 416. A non-inverting input of operational amplifier 430 is connected to the second terminal end of resistor 470 at node 414. The non-inverting input of operational amplifier 430 is coupled with the first terminal end of resistor 475 via node 422. A voltage output of operational amplifier 430 is connected to a first terminal end of feedback resistor 450 at node 420. A second terminal end of feedback resister 450 is connected to the first terminal end of resistor 475 at node 418. The second terminal end of feedback resistor 450 is also connected to the non-inverting input of operational amplifier 430 via node 422. The voltage output of operational amplifier 430 is also connected to indicator circuit 258 at node 236.

Microphone activity sensing circuit 252 sends a $V_{MIC\_DETECT}$ signal to indicator circuit 258 at node 236. $V_{MIC\_DETECT}$ signal corresponds to a voltage output 424 of Schmitt-trigger circuit 410. Schmitt-trigger circuit 410 may be an operation-amplifier (op-amp) based Schmitt-trigger such as a non-symmetrical Schmitt-trigger. The non-symmetrical Schmitt-trigger may provide two different non-symmetrical thresholds. A reference voltage can be equal to a supply voltage provided to the op-amp. An output of the non-symmetrical Schmitt-trigger will switch off when voltage input values reach an upper threshold because the voltage input is connected to the inverting input of the op-amp. The output of the non-symmetrical Schmitt-trigger will switch on when the voltage input values reach a lower threshold. As shown in FIG. 4, the voltage input needs to decline below a value of a voltage derived at node 422 to switch the output of the non-symmetrical Schmitt-trigger to ON. The voltage input thereby needs to rise above the value of the voltage derived at node 422 to switch the output to OFF.

Webcam and microphone activity sensing subsystem 205 therefore monitors the output signal that is output from microphone 238 in response to power supplied from power input 248. Microphone 238 may, for example, be a pulse density modulation (PDM) microphone, which outputs a digital signal that changes rapidly to encode the analog audio information from the microphone element itself. Without the rapid logic state changes of the digital signal of PDM, no audio can be communicated. If microphone 238 is turned off (for example power is removed from it), its output will not change. If the output of microphone 238 remains unchanged, low pass filter 402 will pass the steady state of the microphone output to hardware trigger circuit 404. For example, if power from power input 248 is removed from node 231, node 232 at the output of microphone 238 may fall to the voltage of equipotential 490.

When low pass filter 402 provides a low voltage, such as that of equipotential 490, to the inverting input of operational amplifier 430 of hardware trigger circuit 404, such a low voltage will be below the output voltage threshold V_thresh at node 414, and operational amplifier 430 will not activate indicator circuit 258. However, if power from power input 248 is applied to node 231 to activate microphone 238, if it is a PDM microphone then the microphone will begin to produce digital pulses at node 232 consistent with PDM. The application of such rapidly switching digital pulse to low pass filter 402 will result in low pass filter 402 effectively averaging the voltage of the low logic level portions of the PDM signal and the high logic level portions of the PDM signal in proportion to their relative cumulative durations.

For a modulation technique such as PDM, the average voltage output by the low pass filter may be approximately halfway between the voltage of the high logic level and the voltage of the low logic level. Resistors 470 and 475 of voltage divider 480 may be chosen to provide an output voltage threshold V_thresh greater than the voltage of the low logic level (such as greater than the voltage of equipotential 490) but less than the voltage halfway between the voltage of the high logic level and the voltage of the low logic level. If a value of the filtered voltage at node 416 rises above the output voltage threshold V_thresh, webcam and microphone activity sensing subsystem 205 sends a signal to indicator circuit 258 to cause an indication that microphone 238 is active and in use.

Figure 5:
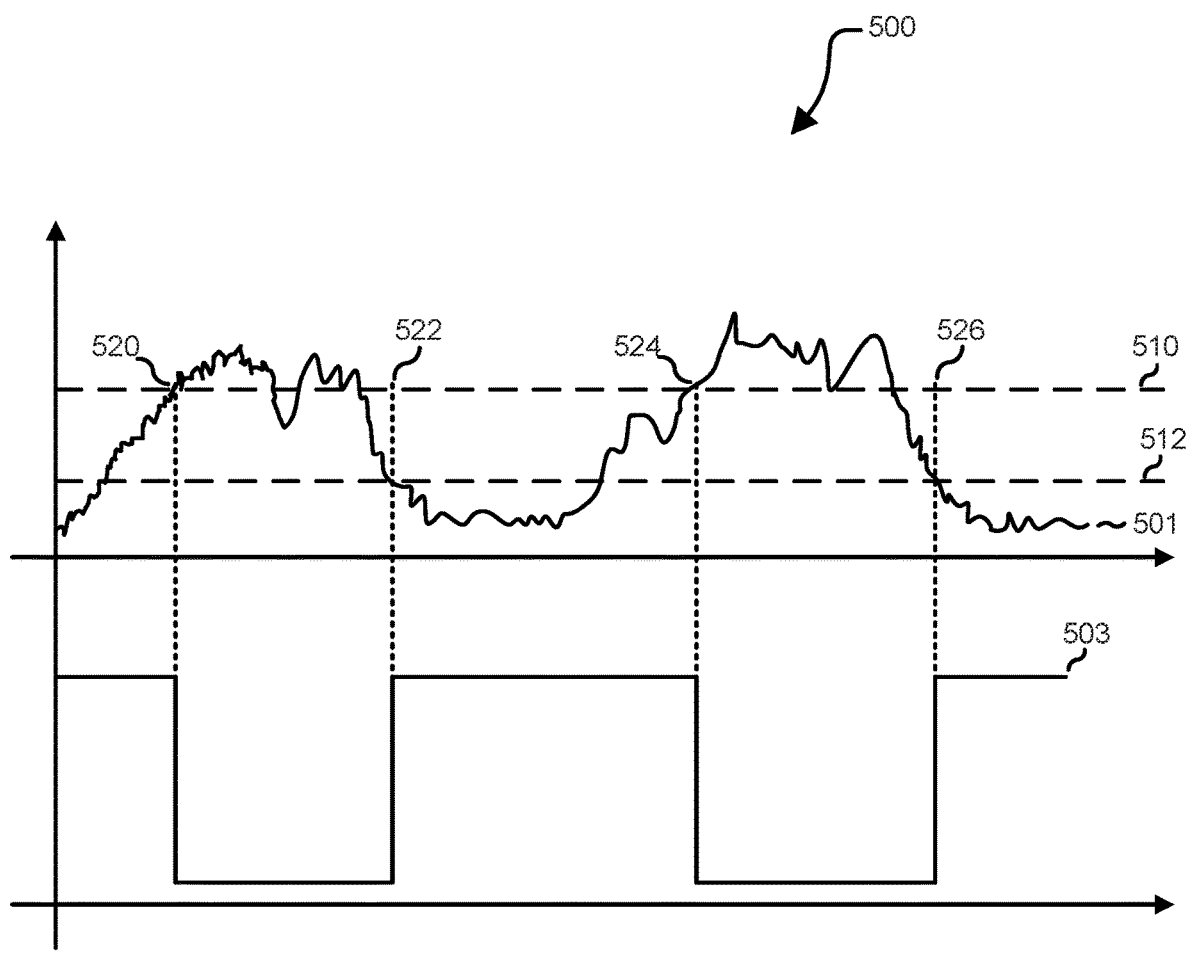
FIG. 5 is a graph illustrating an exemplary relationship between an input magnitude provided to and an output sent from the webcam and microphone activity sensing subsystem according to an embodiment of the present disclosure.

FIG. 5 shows a graph 500 illustrating an exemplary relationship between an input magnitude provided to and an output sent from a webcam and microphone activity sensing subsystem of an information handling system. Graph 500 includes input magnitude values 501, a square wave 503, a dashed vertical line 520, a dashed vertical line 522, a dashed vertical line 524, a dashed vertical line 526, a dashed horizontal line 510, and a dashed horizontal line 512.

Input magnitude values 501 may correspond to a supply current $I_{DD}$ drawn by webcam 228 from power input 248. Input magnitude values 501 may alternatively correspond to a filtered signal at node 416 of FIG. 4 from the processing by low pass filter 402 of a PDM output signal from microphone 238 in response power supplied from power input 248. Square wave 503 may correspond to an output of webcam and microphone activity sensing subsystem 205 in response to the supplied input magnitude. Square wave 503 may correspond to ON and OFF or ACTIVE and IDLE states of webcam 228 or microphone 238.

Dashed horizontal line 510 may correspond to a first threshold supply current level or a first threshold output voltage level. The first threshold supply current level may be a first current magnitude value indicating that webcam 228 is active and in use, a current threshold I_thresh. The first threshold output voltage level may be a first output magnitude value indicating that microphone 238 is active and in use, an output voltage threshold V_thresh. Dashed horizontal line 512 may correspond to a second threshold supply current level or a second threshold output voltage level. The second threshold supply current level may be a second current magnitude value indicating that webcam 228 is inactive and idle. The second threshold output voltage level may be a second output magnitude value indicating that microphone 238 is inactive and idle.

Dashed vertical line 520 may correspond to a first transition state of the output of webcam and microphone activity sensing subsystem 205. The first transition state may correspond to a first active and in use state of webcam 228 or microphone 238. Dashed vertical line 522 may correspond to a second transition state of the output of webcam and microphone activity sensing subsystem 205. The second transition state may correspond to a first inactive and idle state of webcam 228 or microphone 238. Dashed vertical line 524 may correspond to a third transition state of the output of webcam and microphone activity sensing subsystem 205. The third transition state may correspond to a second active and in use state of webcam 228 or microphone 238. Dashed vertical line 526 may correspond to a fourth transition state of the output of webcam and microphone activity sensing subsystem 205. The fourth transition state may correspond to a second inactive and idle state of webcam 228 or microphone 238.

Webcam and microphone activity sensing subsystem 205 monitors input magnitude values 501. At intersections of dashed horizontal line 510 with dashed vertical lines 520 and 524, a value of an input magnitude of input magnitude values 501 rises above the supply current threshold I_thresh or the output voltage threshold V_thresh. The output of webcam and microphone activity sensing subsystem 205 transitions to indicate the active and in use state for webcam 228 or microphone 238. The output may be a first signal that causes indicator circuit 258 to send the active and in use indication/notification to the user. At intersections of dashed horizontal line 510 with dashed vertical lines 522 and 526, a value of an input magnitude of input magnitude values 501 falls below the second threshold supply current level or a second threshold output voltage level. The output of webcam and microphone activity sensing subsystem 205 transitions to indicate the inactive and idle state for webcam 228 or microphone 238. The output may be a second signal that causes indicator circuit 258 to disable the indication/notification.

Graph 500 may correspond to a relationship between the supply current $I_{DD}$ to webcam 228 and a value output from webcam and microphone activity sensing subsystem 205 based on a magnitude of the supply current $I_{DD}$ being greater than a current threshold I_thresh. Graph 500 may alternatively correspond to a relationship between the filtered signal at node 416 of FIG. 4 after the filtering by low pass filter 402 of the PDM output from microphone 238 and the value output from webcam and microphone activity sensing subsystem 205 based on a magnitude of the filtered voltage being greater than an output voltage threshold V_thresh.

Figure 6:
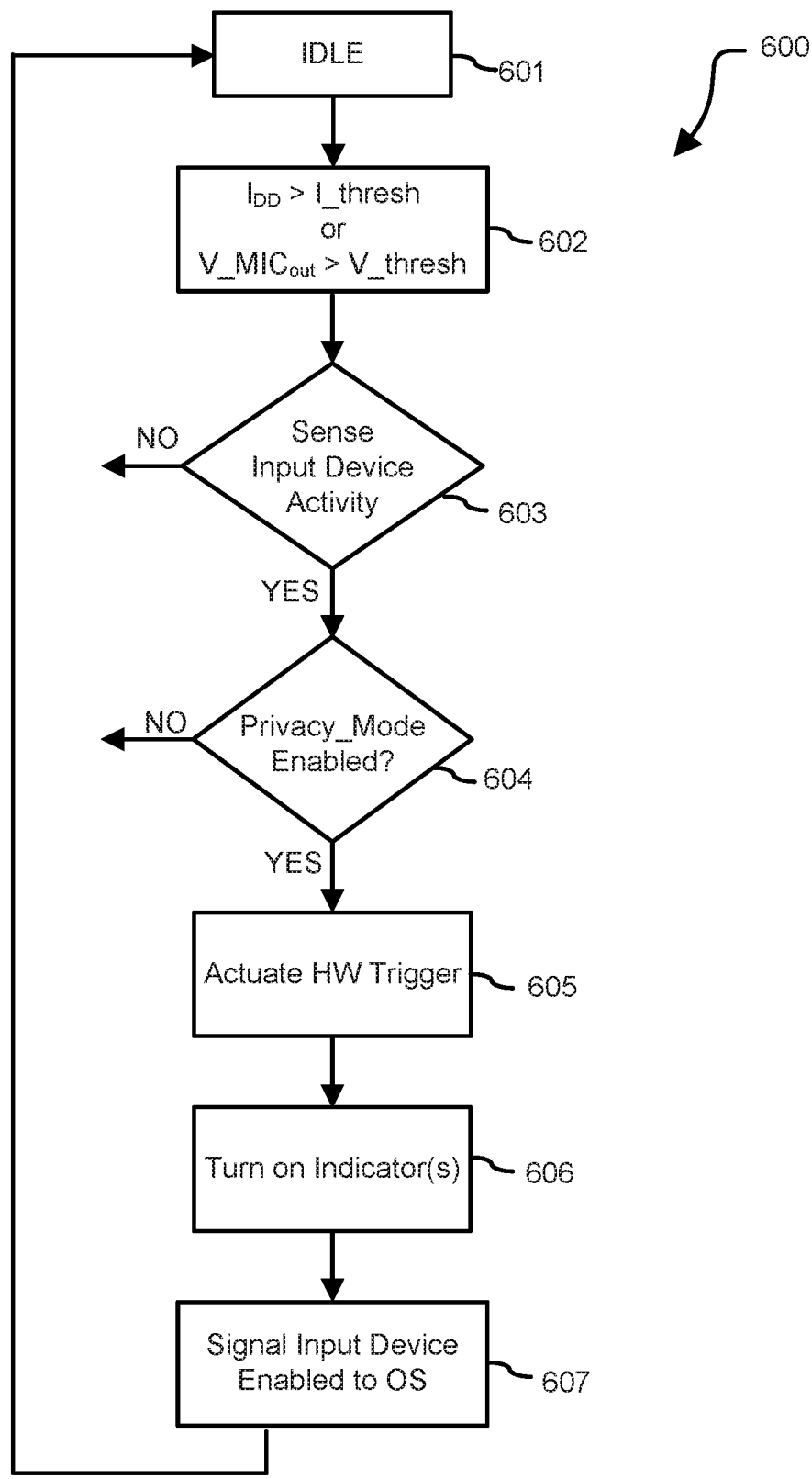
FIG. 6 is a flow chart illustrating a method of operation of a webcam and microphone activity sensing subsystem according to an embodiment of the present disclosure.

FIG. 6 shows an illustrative aspect of a method of operation and is generally designated 600. Method 600 begins at block 601 where an input device of an information handling system such as a webcam or a microphone is in an idle state or may appear to be in an idle state. The information handling system may correspond to information handling system 200, the webcam may correspond to webcam 228, and the microphone may correspond to microphone 238. From block 601, method 600 continues to block 602.

At block 602 the webcam may draw a supply current $I_{DD}$ from a power input device that is greater than a current threshold I_thresh. The microphone may receive power from the power input device and output an output signal having an average voltage greater than an output voltage threshold V_thresh. The current threshold I_thresh may be a based on a predetermined current threshold, a predetermined value of power drawn by the webcam, a predetermined voltage and a magnitude of power drawn by the webcam, a predetermined magnitude of power and a resistance between the power input device and the webcam, or the like. The current threshold I_thresh may be a based on a product type, or the like for the webcam or the microphone. The microphone receives power from the power input device and then outputs an output signal. The output voltage threshold V_thresh may be a based on a predetermined voltage threshold, a predetermined value of power supplied to the microphone, a predetermined average output voltage $V\_MIC_{out}$ and a magnitude of power supplied to the webcam, or the like. The output voltage threshold V_thresh may be a based on a product type, or the like for the microphone. The power input device may correspond to power input 248. From block 602, method 600 continues to decision block 603.

At decision block 603 webcam and a microphone sensing subsystem monitors the supply current $I_{DD}$ (e.g., of the webcam) and output signal (e.g., of the microphone) and determines or senses whether the webcam or the microphone is in an active state and in use. The webcam and microphone activity sensing subsystem senses device activity at the webcam if the supply current $I_{DD}$ to the webcam is greater than the current threshold I_thresh. The webcam and microphone activity sensing subsystem senses device activity at the microphone if the average output voltage $V\_MIC_{out}$ output by the microphone is greater than the output voltage threshold V_thresh. If the webcam and microphone activity sensing subsystem does not sense any activity at the webcam, the supply current $I_{DD}$ drawn by the webcam is less than the current threshold I_thresh. The webcam is idle and not in use and method 600 returns to block 601. If the webcam and microphone activity sensing subsystem does not sense any activity at the microphone, the average output voltage $V\_MIC_{out}$ of the output of the microphone is less than the output voltage threshold V_thresh. The microphone is idle and not in use and method 600 returns to block 601.

If the webcam and microphone activity sensing subsystem senses activity at the webcam, the supply current $I_{DD}$ drawn by the webcam is greater than the current threshold I_thresh. The webcam is active and in use and method 600 continues to block 604. If the webcam and microphone activity sensing subsystem senses activity at the microphone, the average output voltage $V\_MIC_{out}$ at the output of the microphone is greater than the output voltage threshold V_thresh. The webcam and microphone activity sensing subsystem may correspond to webcam and microphone activity sensing subsystem 205. The microphone is active and in use and method 600 returns to block 604.

At block 604 a determination as to whether the information handling system is set to a privacy_mode. If the information handling system is not set to the privacy_mode, method 600 returns to block 601. If the information handling system is set to the privacy_mode, method 600 continues to block 605.

At block 605 a hardware trigger is actuated. The hardware trigger may correspond to hardware trigger circuit 304 or hard trigger circuit 404. In response to the hardware trigger actuation, method 600 continues to block 606.

At block 606 the hardware trigger may cause an indicator circuit to turn on or activate an LED or the like, an audio toner or the like, or a haptic feedback or the like. The indicator circuit may turn on any combination of the visual, audio, or haptic notifications or indicators. The hardware trigger may alternatively actuate a mechanical shutter to open and close a slider mechanism to give users a visual indication that the camera has been actuated and is in use. The indicator circuit may correspond to indicator circuit 258 and the LED may correspond to LED device 340. In response to the webcam and microphone activity sensing subsystem turning on the indicator(s), method 600 continues to block 607.

At 607 the input device is in active and in use, even if covertly so, and a signal is sent to a BIOS/EFI module that includes the BIOS/EFI code and code to detect, initialize, and access the input devices of the information handling system. The BIOS/EFI module may correspond to the BIOS/EFI module 140. Method 600 returns to block 601 where the input devices are idle.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a microphone activity sensing circuit configured to couple to a microphone, the microphone activity sensing circuit including:
a low pass filter configured to receive an output of the microphone and to provide a filtered signal; and
a hardware trigger circuit configured to receive the filtered signal from the low pass filter, to detect when the filtered signal indicates that activity of the microphone exceeds a threshold level, and, in response to detection of the microphone activity exceeding the threshold level, to provide a notification signal; and
an indicator circuit configured to receive the notification signal and, in response to receiving the notification signal, to provide a user-perceptible indication, the indicator circuit immune to control by a processor of the information handling system, wherein the hardware trigger circuit includes a first input terminal, a second input terminal, and a second output terminal, the first input terminal coupled to the power supply, the second input terminal coupled to the microphone, and the second output terminal coupled to the indicator circuit.

2. The information handling system of claim 1, wherein the hardware trigger circuit includes a Schmitt trigger circuit.

3. The information handling system of claim 1, wherein the hardware trigger circuit includes a voltage reference.

4. The information handling system of claim 3, wherein the hardware trigger circuit includes a Schmitt trigger comparator circuit, wherein an input of the Schmitt trigger comparator circuit is connected to a reference voltage output of the voltage reference.

5. The information handling system of claim 1, wherein the notification signal causes the indicator circuit to enable a light emitting diode to emit a visual output.

6. The information handling system of claim 1, wherein the notification signal causes the indicator circuit to enable an indicator selected from a group consisting of:
a speaker to output an audible sound;
a haptic device to shake, pulse, or vibrate; and
both the speaker and the haptic device.

7. The information handling system of claim 1, wherein the indicator circuit is coupled to the hardware trigger circuit, and wherein the indicator circuit and the hardware trigger circuit are included in an information handling system.

8. An information handling system comprising:
a microphone activity sensing circuit configured to couple to a microphone, the microphone activity sensing circuit including:
a low pass filter configured to receive an output of the microphone and to provide a filtered signal;
a hardware trigger circuit configured to receive the filtered signal from the low pass filter, to detect when the filtered signal indicates that activity of the microphone exceeds a threshold level, and, in response to detection of the microphone activity exceeding the threshold level, to provide a notification signal; and
an indicator circuit configured to receive the notification signal and, in response to receiving the notification signal, to provide a user-perceptible indication, the indicator circuit immune to control by a processor of the information handling system, wherein the notification signal causes the indicator circuit to actuate a mechanical shutter to:
expose a microphone aperture based on the microphone having an active state; and
obscure a microphone aperture based on the microphone having an idle state.

9. The information handling system of claim 8, wherein the hardware trigger circuit includes a Schmitt trigger circuit.

10. The information handling system of claim 8, wherein the hardware trigger circuit includes a voltage reference.

11. The information handling system of claim 10, wherein the hardware trigger circuit includes a Schmitt trigger comparator circuit, wherein an input of the Schmitt trigger comparator circuit is connected to a reference voltage output of the voltage reference.

12. The information handling system of claim 8, wherein the notification signal causes the indicator circuit to enable an indicator selected from a group consisting of:
a speaker to output an audible sound;
a haptic device to shake, pulse, or vibrate; and
both the speaker and the haptic device.

13. The information handling system of claim 8, wherein the notification signal causes the indicator circuit to enable an indicator selected from a group consisting of:
a speaker to output an audible sound;
a haptic device to shake, pulse, or vibrate; and
both the speaker and the haptic device.

14. An information handling system comprising:
a microphone activity sensing circuit configured to couple to a microphone, the microphone activity sensing circuit including:
a low pass filter configured to receive an output of the microphone and to provide a filtered signal; and
a hardware trigger circuit configured to receive the filtered signal from the low pass filter, to detect when the filtered signal indicates that activity of the microphone exceeds a threshold level, and, in response to detection of the microphone activity exceeding the threshold level, to provide a notification signal; and
an indicator circuit configured to receive the notification signal and, in response to receiving the notification signal, to provide a user-perceptible indication, the indicator circuit immune to control by a processor of the information handling system, wherein the notification signal causes the indicator circuit to actuate a piezoelectric speaker to saturate a dynamic range of the microphone.

15. The information handling system of claim 14, wherein the hardware trigger circuit includes a first input terminal, a second input terminal, and a second output terminal, the first input terminal coupled to the power supply, the second input terminal coupled to the microphone, and the second output terminal coupled to the indicator circuit.

16. The information handling system of claim 14, wherein the hardware trigger circuit includes a Schmitt trigger circuit.

17. The information handling system of claim 14, wherein the hardware trigger circuit includes a voltage reference.

18. The information handling system of claim 17, wherein the hardware trigger circuit includes a Schmitt trigger comparator circuit, wherein an input of the Schmitt trigger comparator circuit is connected to a reference voltage output of the voltage reference.

19. The information handling system of claim 14, wherein the notification signal causes the indicator circuit to enable an indicator selected from a group consisting of:
   a speaker to output an audible sound;
   a haptic device to shake, pulse, or vibrate; and
   both the speaker and the haptic device.

20. The information handling system of claim 14, wherein the notification signal causes the indicator circuit to enable an indicator selected from a group consisting of:
   a speaker to output an audible sound;
   a haptic device to shake, pulse, or vibrate; and
   both the speaker and the haptic device.

* * * * *